United States Patent

Wightman et al.

[11] 3,867,047
[45] Feb. 18, 1975

[54] JOINT CONSTRUCTION
[75] Inventors: Lawrance W. Wightman, St. Louis; Howard C. Gebhart, Chesterfield; Nick Tichy, Affton, all of Mo.
[73] Assignee: Emerson Electric Co., St. Louis, Mo.
[22] Filed: Nov. 12, 1973
[21] Appl. No.: 415,008

[52] U.S. Cl.................. 403/242, 52/667, 403/186, 403/284
[51] Int. Cl............................................. F16b 9/00
[58] Field of Search .......... 403/186, 230, 252, 240, 403/257, 242, 263, 256, 274, 403, 284, 285; 52/664, 667

[56] References Cited
UNITED STATES PATENTS

| 338,877 | 3/1886 | Ritchie | 403/274 X |
| 1,503,880 | 8/1924 | Broman | 403/252 X |
| 1,637,652 | 8/1927 | Ness | 403/252 X |
| 2,216,319 | 10/1940 | McGee | 403/242 X |
| 3,050,160 | 8/1962 | Chesser | 403/274 |
| 3,177,990 | 8/1965 | Flucker et al. | 52/667 |
| 3,315,996 | 4/1967 | Sedo | 403/252 |

Primary Examiner—Jordan Franklin
Assistant Examiner—Wayne L. Shedd
Attorney, Agent, or Firm—Polster and Polster

[57] ABSTRACT

A folded joint between two structural members and method for forming the same are provided. One of the structural members exerts a spring force against the other structural member after joint formation. The spring force maintains the members in tight, locking engagement with one another.

10 Claims, 6 Drawing Figures

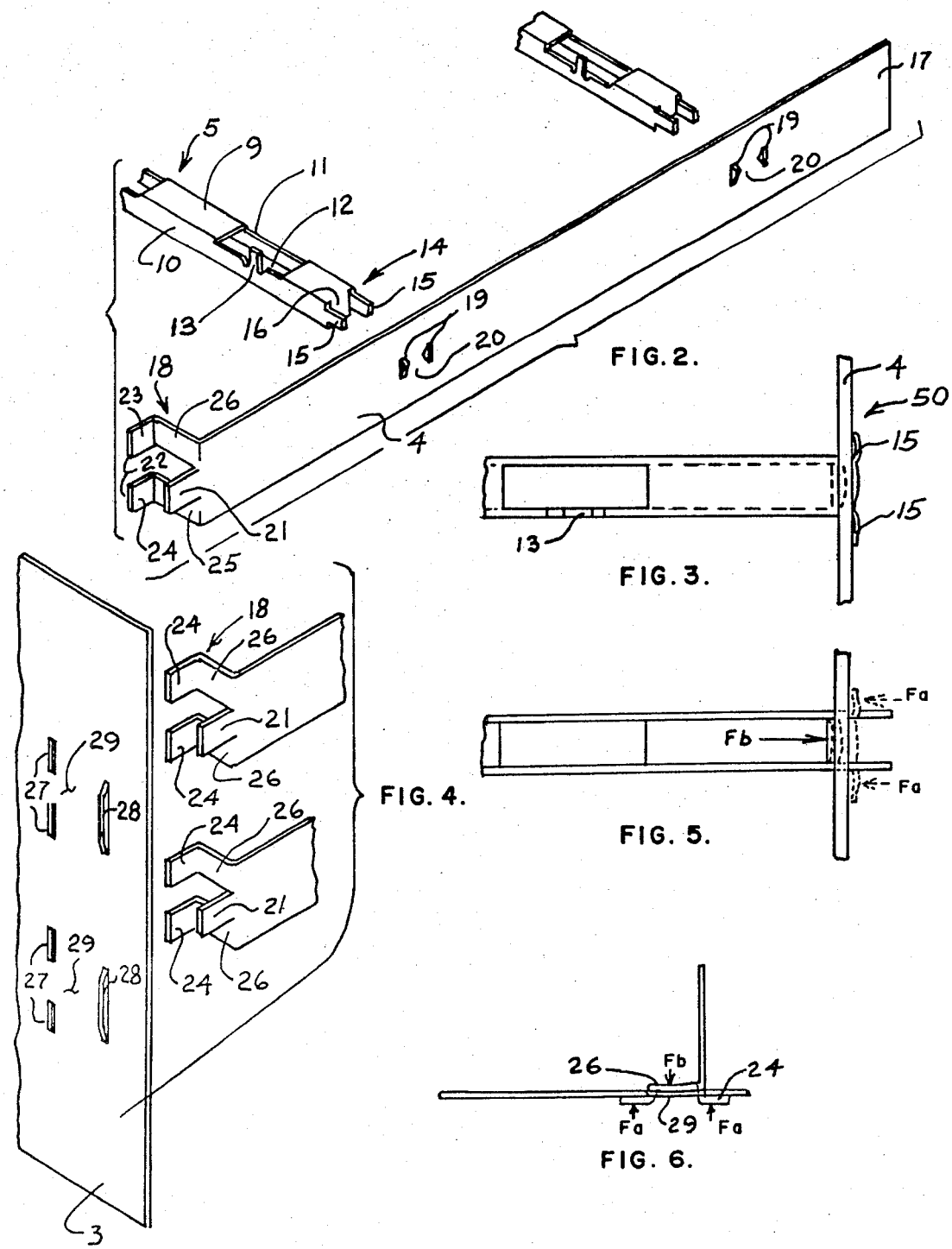

JOINT CONSTRUCTION

REFERENCE TO RELATED APPLICATION

This application contains subject matter disclosed in application Ser. No. 415,007 filed concurrently herewith by the inventors of this application.

BACKGROUND OF THE INVENTION

This invention relates to metal joint formation and in particular, to a folded type joint between two structural parts. While the invention is described with particular detail concerning its utilization in an open coil electrical heater, those skilled in the art will recognize the wide applicability of the invention in other applicational uses.

Open coil heaters conventionally include a frame adapted to carry a plurality of heater coils. The heater coils are electrically connected to a power source and are insulated from the frame by suitable insulation means. The frame conventionally has provisions for carrying a plurality of layers of the coils. Because of the heat generated during heater operation, the frame structure must be constructed from a heat resistive material. While several materials may be used, sheet metal of sufficient thickness generally is suitable, as it is lower in cost than other materials useful for this purpose. Frame structure construction is complicated in that a relatively large number of interconnections between the various members forming the frame structure are required. It heretofore has been conventional to weld or rivet the various structural components of the frame to one another. This is a time consuming and inefficient construction method at best and the open coil heater industry long has sought a construction assembly process that would lend itself to automation. Folded tab joints are in old expedient for such joint formation. In this construction method, metal tabs are constructed on a first member and inserted through openings in a second member. The tabs are folded to complete the joint construction. The folded tab joint has been unacceptable as a construction method for open coil heaters because prior art folded joints become loose over a period of time. This defect is inherent with folded joint construction because the folded tab, particularly when it is metal, attempts to return to its unfolded condition, in accordance with well known physical laws. Because the folded tab is stressed beyond its elastic limit, the tab obviously can not return to such condition, but the tendency is sufficiently strong to loosen the joint, making those joints unacceptable.

The invention disclosed hereinafter makes use of the tendency of metal to assume its original shape, previously considered a deficiency with a folded joint, to lock structures to one another. Consequently, a simple, secure, low cost, easily automated folded joint is provided which maintains structural rigidity between structural members without using welds or rivets.

One of the objects of this invention is to provide an improved joint between two structural members.

Another object of this invention is to provide a spring tight joint between two parts.

Another object of this invention is to provide a joint between structural members that may be employed in an automated construction process.

Yet another object of this invention is to provide a low cost frame structure.

Other objects of this invention will be apparent to those skilled in the art in light of the following description and accompanying drawings.

SUMMARY OF THE INVENTION

In accordance with this invention, generally stated, a spring tight joint is provided between two structural members. In the preferred embodiment, a first one of the two structural members has a pair of foldable tabs and lever means formed in it. The second of the two members has a pair of spaced, tab receiving openings. The area between the openings defines a spring web. The tabs are inserted through the openings and a first force is applied to fold the tabs into abutting relationship with the second member. A second force is applied in a direction opposite to the first force so as to bow the spring web oppositely of the tab fold while maintaining the abutting relationship of the lever means and the web. After force removal, the spring web tendency to return to its original position coacts with the lever means to transmit a force to the foldable tab that acts to maintain the two structural members in tightly locked engagement.

BRIEF DESCRIPTION OF THE DRAWINGS

In the drawings,

FIG. 2 is an exploded view in perspective of structural members, formed in accordance with the principles of this invention, prior to their engagement;

FIG. 3 is a top plan view of a joint formed in accordance with the principles of this invention;

FIG. 4 is a bottom plan view diagrammatically illustrating the formation of the joint of this invention;

FIG. 5 is an exploded view in perspective, partly broken away, illustrating a second embodiment for forming the spring tight joint of this invention; and FIG. 6 is a top plan view of the joint formed in conjunction with the structural member embodiment of FIG. 5.

DESCRIPTION OF THE PREFERRED EMBODIMENT

Figure 1:
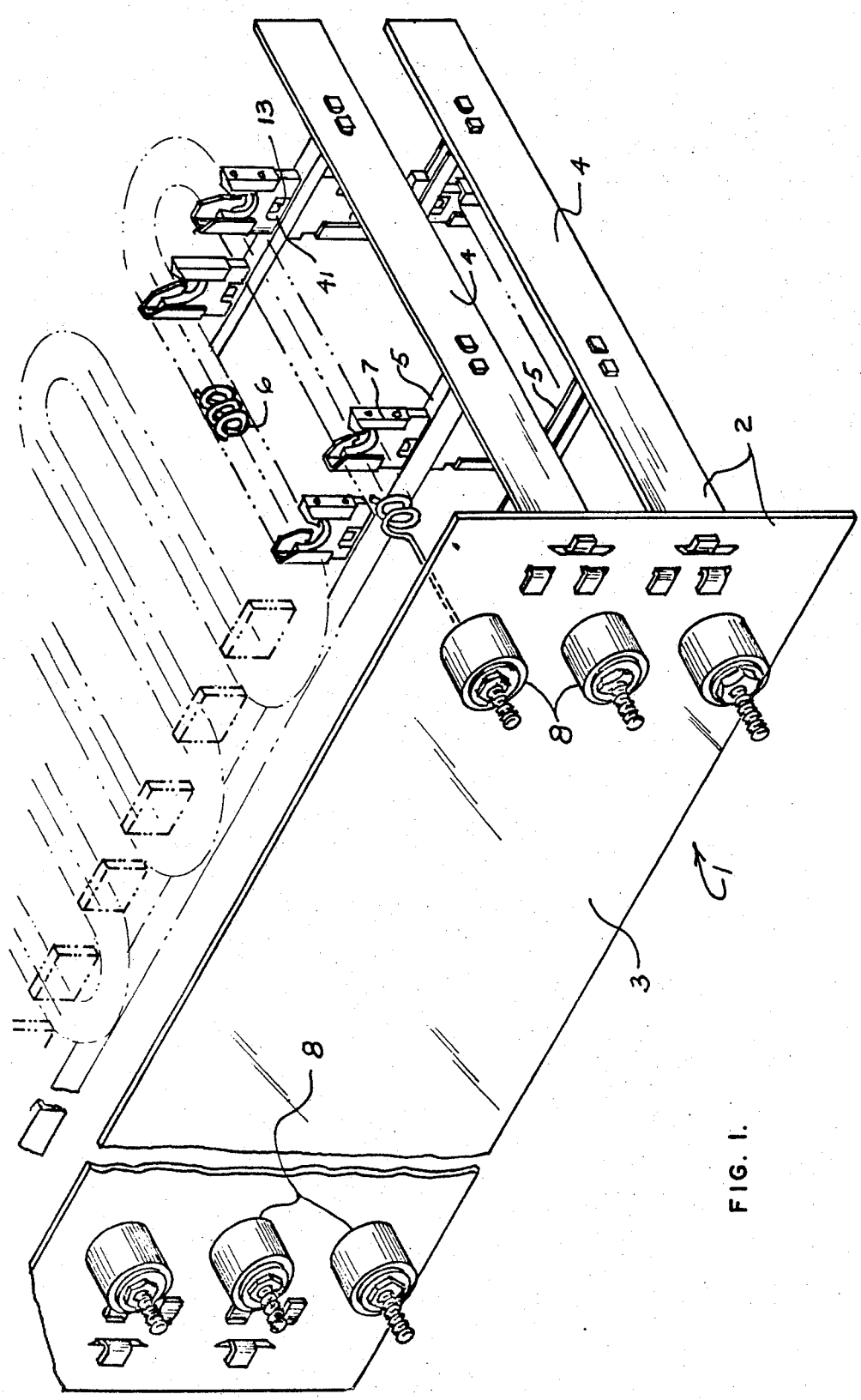
FIG. 1 is a view in perspective, partly broken away, of an open coil heater having a frame constructed in accordance with the principles of this invention.

Referring now to the drawings in which like reference numerals are employed to indicate like parts in the various views, and particularly to FIG. 1, reference numeral 1 indicates an open coil heater having a frame 2. The frame 2 includes a front plate 3, a first pair of side rails 4, a second pair of side rails, not shown, but oppositely opposed to the side rails 4 illustrated in FIG. 1, and a plurality of transversely extending coil support members 5.

It may be observed, in FIG. 1, that the heater 1 has at least one resistive coil 6 supported by a coil support means 7, a plurality of which are mounted to the coil support members 5. Details of the construction for coil support means 7 are contained in the copending Wightman et al United States application, Ser. No. 415,007 filed Nov. 12, 1973. The front plate 3 also has a plurality of control means 8 extending through it which are electrically connected to the respective ends of the resistive coils 6 and are used to control power output of the heater 1. The operation of the heater 1 and the structural correlation of the electrical components thereof form no part of this invention, and are not described in detail.

Referring now to FIG. 2, it may be observed that each coil support member 5 generally is rectangular in plan and includes a top 9 having a pair of oppositely opposed sides 10 and 11 respectively, extending downwardly from it. The top 9 has an opening 12 in it and the side 10 has an upwardly extending projection 13 integrally formed with it. The member 5, including the opening 12, may be punched from a metal strip and the projection 13 may be formed from the material blanked out to form the opening 12. Thereafter, the sides 10 and 11 are formed by folding the metal in the particular configuration indicated in FIG. 2.

A first end 14 of the member 5 has a pair of spaced tabs 15 and a spring lever 16 formed in it. Again, it is convenient to punch the tabs 15 and lever 16 from a metal strip, thereafter folding the strip to obtain the configuration illustrated. The end opposite the end 14 of the member 5, not shown, is constructed similarly to the end 14.

An individual one of the side rails 4 is illustrated in FIG. 2. As there shown, the rail 4 is rectangular in plan, having a squared end 17 and a preformed end 18. The rail 4 has at least one pair of spaced openings 19 punched in it. The openings 19 are sized and spaced so as to receive the tabs 15 of the member 5 in a free, slip fit. The area between the opening pair 19 defines a spring web 20, the purpose of which is described hereinafter. It will be apparent to those skilled in the art that a number of the opening pairs 19 may be formed in the side rails 4, the final number being governed by manufacturing considerations not pertinent here.

The end 18 of the side rail 4 has a longitudinally extending tab 21 and a pair of L-shaped parts 22 formed in it. Each of the parts 22 have a first leg 23 defining a tab 24 and a leg 25 defining a lever arm 26.

The front plate 3 has at least a pair of substantially similar, spaced openings 27 through it, positioned near an elongated opening 28, also extending through the first plate 3. The openings 27 and 28 are intended to receive the tabs 24 and 21 in a loose fit. The area between the openings 27 and 28 defines a spring web 29.

Referring now to FIGS. 3, 4 and 6, it may be seen that the tabs 15 of the member 5 may be inserted in the opening pair 19 of the side rail 4 in a conventional member. Thereafter, the tabs 15 are folded by applying a force $F_a$ on the tabs 15, indicated by phantom lines in FIG. 4, so as to fold the tabs 15 against the side rail 4. The final position of the tabs 15 also is indicated by phantom lines in FIG. 5. Simultaneously with the application of force $F_a$ on the tabs 15, a force $F_b$ is applied against the spring lever 16 of the member 5 so that the spring web 20 of the side rail 4 is forced outwardly in a direction opposite to the direction of the force $F_a$ applied to the tabs 15. Upon completion of the application of the forces $F_a$ and $F_b$, a joint 50 between the member 5 and side rail 4 is formed. Since the force $F_b$ is applied along the spring lever 16, the lever 16 remains in abuttment with the spring web 20. The final form of the joint 50 construction is illustrated in FIG. 3.

Because of the elasticity of the material used for the various structural components forming the frame 2, the structural components will attempt to return to their original configuration after removal of the forces $F_a$ and $F_b$. This tendency if present even if, as in the case of the tabs 15, the material is stressed beyond its elastic limit and results in permanent plastic deformation or set. In prior art folded tab joints, the elasticity of the tabs 15 tended to disengage the abutting relationship of the structural components formed after folding the tabs, resulting in a loose joint. In the joint 50 of this invention, however, the tendency of the tabs 15 to assume their original shape is counter-balanced by the action of the spring web 20. That is, the web 20 also is attempting to assume its original shape. Consequently, the web 20 exerts a force on the spring lever 16 of the member 5. The residual force exerted by the web 20 on the lever 16 acts oppositely to the residual tendency of the tabs 15 to return to their non-deformed position, keeping the tabs 15 in tight, locking engagement with the side rails 4.

The same result is obtained from the structural embodiment shown in FIGS. 5 and 6. In the embodiment, the tabs 21 and 24 have the force $F_a$ applied to them, folding those tabs into abutment with the front plate 3, while each of the lever arms 26 has the force $F_b$ applied to them so as to spring the web 29 in an opposite direction. Again, the tendency of the tabs 24 to return to their original configuration, shown in FIG. 4, is counter balanced by the web portion 29 acting on the spring lever 26, tending to force the tabs 24 to abutment with the front plate 3.

Numerous variations, within the scope of the appended claims, will be apparent to those skilled in the art in light of the foregoing description and accompanying drawings. Thus, the joint of this invention may find application in a great many sheet metal structures in addition to the heater 1 described above. While the preferred embodiment was described as utilizing a two or three tab configuration in order to attach two structural members to one another, a single tab may be sufficient in certain applications. For example, the projection or tab 13 formed in the coil support member 5 may be placed adjacent a circular opening 41 in a second member. The projection 13 thereafter is pushed axially inwardly of the opening in the second member, along the center portion of the projection 13 so as to form a U or V-shaped fold in the tab. Provided the projection 13 has a greater length than the diameter of the opening 41 in non-folded state of the projection, the projection 13, in the folded state, will tend to exert a force radially outwardly, locking the member 5 to the second member. This form of joint construction is used in the heater 1 for attaching the coil support means 7 to the support member 5. These variations are merely illustrative.

Having thus described the invention, what is claimed and desired to be secured by Letters Patent is:

1. A structure, comprising:
a first structural member having at least two spaced openings in it, the area between said openings defining a spring web; and
a second structural member having at least two tabs and a spring lever formed in it, said tabs being inserted through the openings in said first member and folded against said first member with a first applied force, said spring web and said spring lever having a second force applied to them in a direction opposite to said first applied force so that said spring web is sprung in a direction opposite to the direction of said first applied force, said spring web abutting said spring lever so that the elasticity of the web material causes said spring web to exert a residual force against said spring lever, establishing a tight joint.

2. The structure of claim 1 wherein said first and said second structural members are constructed from sheet metal.

3. The structure of claim 2 wherein said first structural member has three spaced openings in it, and said second structural member has a first end having a pair of L-shaped parts formed in it, a first leg of each of said L-shaped parts defining a tab member and a second leg of each of said L-shaped parts defining a lever arm.

4. An open coil heater frame comprising:
a first structural member having at least two spaced openings in it, the area between said openings defining a spring web;
a second structural member having a first end and a second end, at least one of said first and said second ends having a pair of foldable tabs and at least one spring lever formed in it, said tabs being inserted through the openings in said first member and folded against said first member, said spring web being displaced in a direction opposite to the direction of said fold, said spring lever abutting said spring web so that the elasticity of the web material causes said web to exert a force against said spring lever after joint formation.

5. The open coil heater frame of claim 4 wherein the foldable tabs of said second structural member are parallel to one another, said spring lever being formed between said tabs.

6. The open coil heater frame of claim 4 wherein said second structural member includes a pair of L-shaped parts formed on an end thereof, each of said L-shaped parts having a first leg and a second leg, the first leg of each said L-shape defining said foldable tab and the second leg of each of said L-shape defining a lever arm.

7. A method of joint construction comprising:
providing a first structural member with at least two tabs and a spring lever;
providing a second structural member with at least two spaced openings adapted to receive said tabs, the area between said openings defining a spring web;
inserting the tabs of said first member into the openings of said second member;
folding said tabs against said second member while maintaining said spring lever and said spring web in contact with one another; and
displacing said spring web in a direction opposite to the direction of the fold of said tabs while maintaining said spring lever and said spring web in contact with one another.

8. The method of claim 7 wherein said folding and said displacing steps are accomplished simultaneously.

9. The method of claim 8 wherein said second structural member is provided with three openings and said first structural member is provided with at least a pair of L-shaped parts having a first and a second leg along one end thereof, one of said legs of each of said L-shaped parts forming a tab and the other of said legs forming a spring lever.

10. A structure comprising:
a first structural member having at least two spaced openings in it, the area between said openings defining a spring web; and
a second structural member having a first end and a second end, at least one of said first and said second ends having a pair of foldable tabs and at least one spring lever formed in it, said tabs being inserted through the openings in said first member and folded against said first member, said spring web being displaced in a direction opposite to the direction of said fold, said spring lever abutting said spring web so that the elasticity of the web material causes said web to exert a residual force against said spring lever after joint formation.

* * * * *